(12) United States Patent
Tsuchiya et al.

(10) Patent No.: US 8,109,439 B2
(45) Date of Patent: Feb. 7, 2012

(54) COMMODITY REGISTRATION PROCESSING APPARATUS

(75) Inventors: Osamu Tsuchiya, Shizuoka (JP); Hitoshi Iizaka, Shizuoka (JP); Yoshiya Yamada, Shizuoka (JP); Hidemi Mihara, Shizuoka (JP); Norihiko Kurihara, Shizuoka (JP); Hidehiro Naitou, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 364 days.

(21) Appl. No.: 12/419,813

(22) Filed: Apr. 7, 2009

(65) Prior Publication Data

US 2009/0250516 A1    Oct. 8, 2009

(30) Foreign Application Priority Data

Apr. 8, 2008    (JP) .................................. 2008-100703

(51) Int. Cl.
*G06Q 30/00*    (2006.01)

(52) U.S. Cl. .............................. 235/385; 705/22; 705/28

(58) Field of Classification Search .................... 235/383
See application file for complete search history.

(56) References Cited

U.S. PATENT DOCUMENTS

| 5,543,607 | A | * | 8/1996 | Watanabe et al. .............. 235/383 |
| 5,640,002 | A | * | 6/1997 | Ruppert et al. ........... 235/462.46 |
| 5,679,941 | A | * | 10/1997 | Iizaka et al. .................... 235/383 |
| 2009/0192909 | A1 | | 7/2009 | Iizaka et al. |
| 2009/0210310 | A1 | | 8/2009 | Mihara et al. |

FOREIGN PATENT DOCUMENTS

JP    2002-150434    5/2002

* cited by examiner

*Primary Examiner* — Jamara Franklin
(74) *Attorney, Agent, or Firm* — Turocy & Watson, LLP

(57) ABSTRACT

A commodity registration processing apparatus detects, with a commodity sensor, whether a commodity is present in an imaging area of an imaging device and, when the commodity sensor detects that the commodity is present in the imaging area, decodes a commodity code barcode or the commodity code barcode and a discount barcode on the basis of image data acquired by imaging by the imaging device, and performs registration and price adjustment processing for the commodity on the basis of a decoding result of the commodity code barcode or the decoding result of the commodity code barcode and a decoding result of the discount barcode.

7 Claims, 3 Drawing Sheets

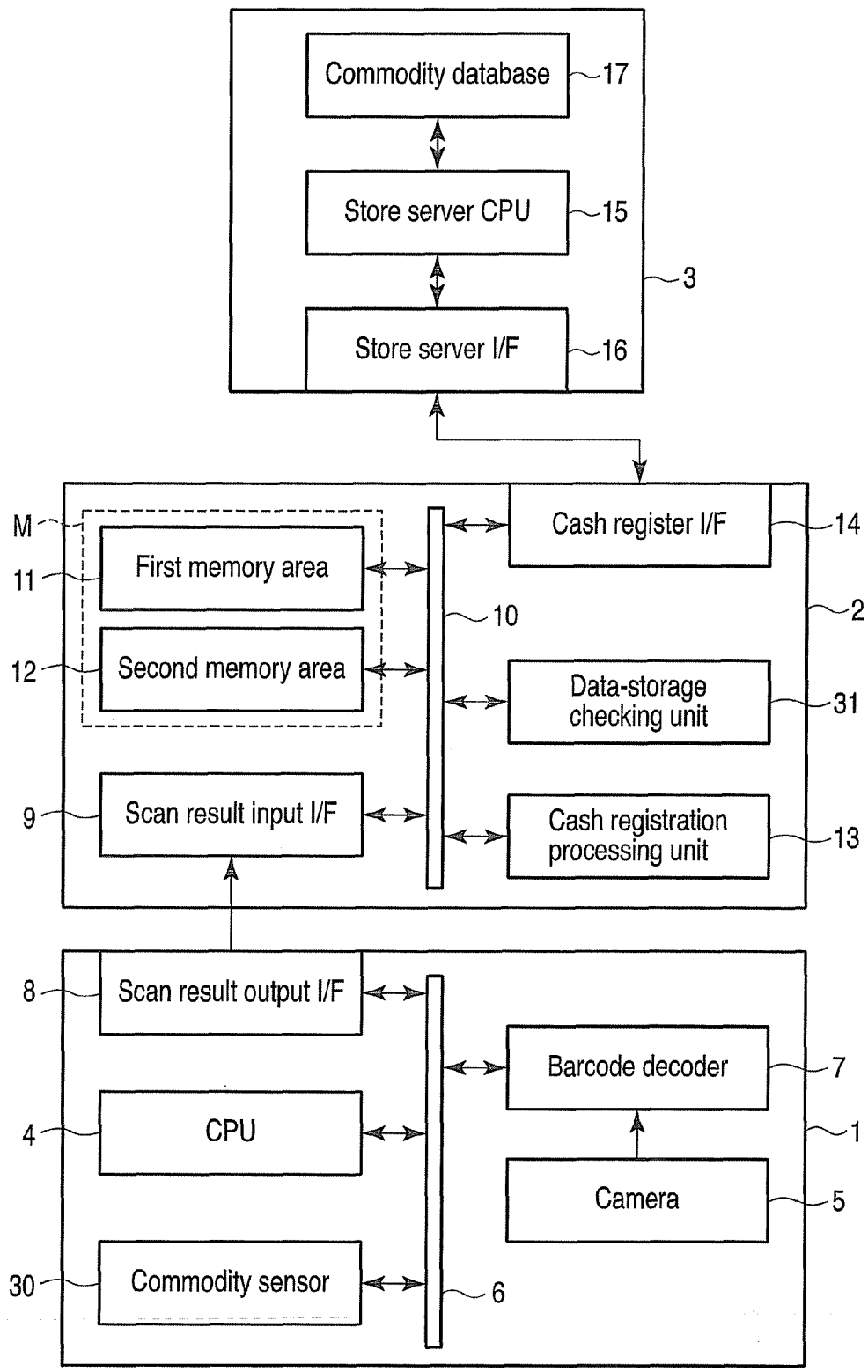
F I G. 1

COMMODITY REGISTRATION PROCESSING APPARATUS

CROSS-REFERENCE TO RELATED APPLICATION

This application is based upon and claims the benefit of priority from the prior Japanese Patent Application No. 2008-100703 filed on Apr. 8, 2008, the entire contents of which are incorporated herein by reference.

TECHNICAL FIELD

The present invention relates to a commodity registration processing apparatus used for registration and price adjustment processing including discounts of commodities in a store such as a supermarket.

BACKGROUND

In a store, when a commodity such as food approaches a freshness date or an expiration date thereof after the commodity is displayed in a selling floor, early sale of the commodity is promoted by reducing the price of the commodity. When the early sale, special price sale, or the like of the commodity is performed, for example, as disclosed in JP-A-2002-150434, a label printed with a barcode representing new discount information, for example, information concerning 30 yen discount is attached to the commodity in addition to a price tag of the commodity. As commodity registration processing, a barcode of a commodity code printed on the price tag of the commodity and the barcode representing the new discount information are scanned at a time and the barcode of the commodity code and the barcode representing the discount information are discriminated. If the barcode representing the discount information is scanned, a sales price after discount is registered.

However, in JP-A-2002-150434, when a barcode is scanned by a barcode scanner, depending on operation of the barcode scanner by a casher, it is likely that the casher scans only the barcode of the commodity code printed on the price tag of the commodity and finishes the work without scanning the barcode representing the new discount information.

The casher operates the barcode scanner in order to fit the barcode of the commodity code and the barcode representing the discount information in one imaging area. However, the casher has to adjust a position and a posture such as a tilt angle of the commodity with respect to the barcode scanner. Therefore, operability is deteriorated.

SUMMARY

It is an object of the present invention to provide a commodity registration processing apparatus with improved operability that can surely scan a first barcode representing code information of a commodity according to presence or absence of a discount of a commodity or the first barcode and a second barcode representing a discount code of the commodity and perform registration processing for the commodity.

According to an aspect of the present invention, there is provided a commodity registration processing apparatus that performs at least registration processing for a commodity on the basis of at least a first data code attached to the commodity, the commodity registration processing apparatus including: an imaging device that images the first data code or the first data code and a second data code; a commodity sensor that detects whether the commodity is present in an imaging area of the imaging device; a decoding unit that decodes, while the commodity sensor detects that the commodity is present in the imaging area, the first data code or the first data code and the second data code on the basis of image data acquired by the imaging by the imaging device; and a registration processing unit that performs at least registration processing for the commodity on the basis of a decoding result of the first data code acquired by the decoding unit or the decoding result of the first data code and a decoding result of the second data code.

DESCRIPTION OF THE DRAWINGS

FIG. 1 is a diagram of a commodity registration processing apparatus according to an embodiment of the present invention;

DETAILED DESCRIPTION

An embodiment of the present invention is explained below with reference to the accompanying drawings.

Figure 2:
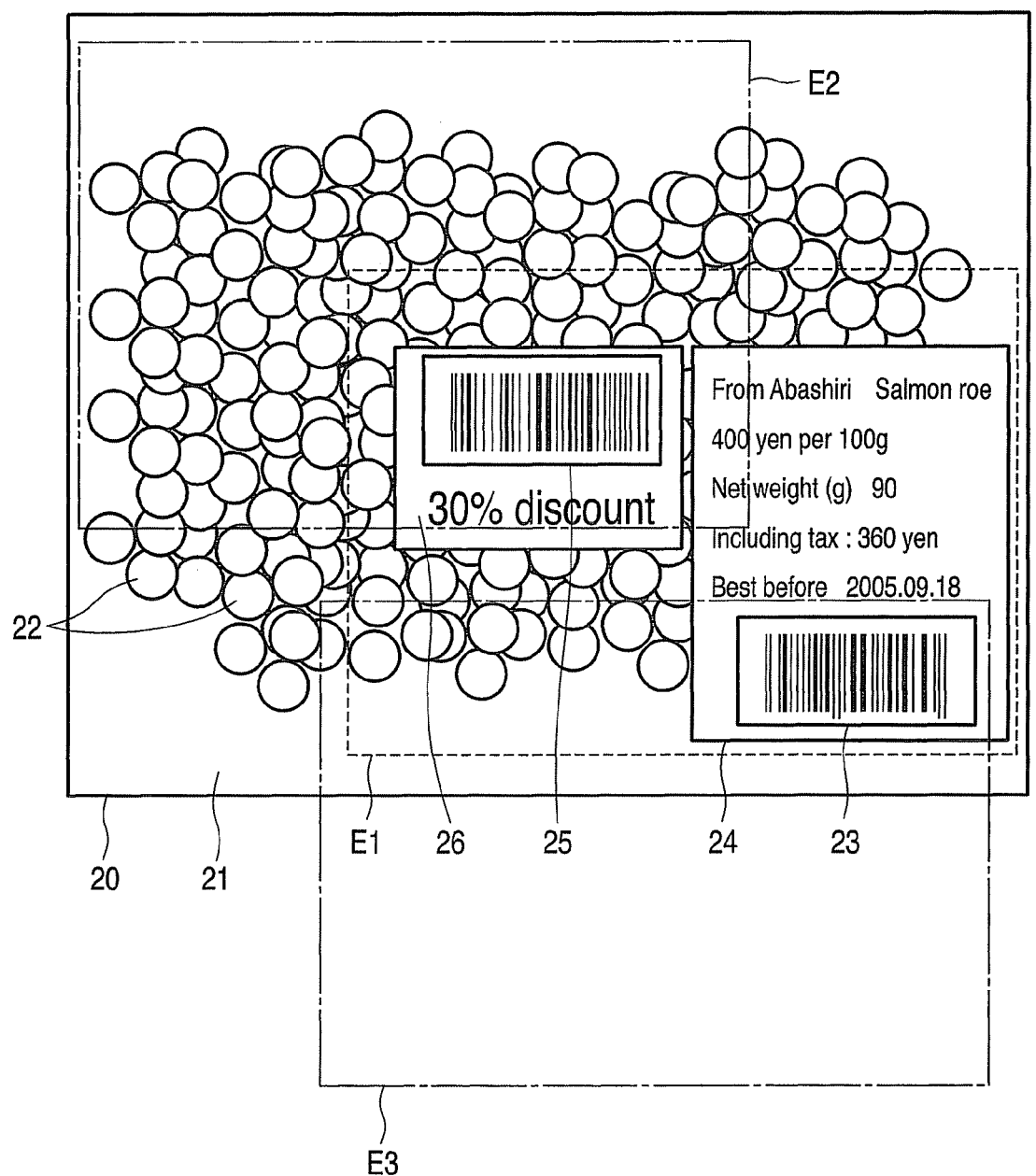
FIG. 2 is a diagram of an example of a price tag and a discount barcode label attached to a commodity to be subjected to commodity registration processing by the apparatus.

FIG. 1 is a block diagram of a commodity registration processing apparatus according to the embodiment. FIG. 2 is a diagram of an example of a commodity 20 as a target to be subjected to registration processing by the apparatus. The commodity 20 includes commodity contents 22 such as foods stored in a commodity container 21. A price tag 24 and a discount label 26 are attached to the commodity 20. A commodity code barcode 23 as a first barcode representing a code of the commodity 20 (hereinafter referred to as commodity code barcode 23 of the price tag 24) is printed on the price tag 24. A discount barcode 25 as a second barcode representing a discount of the commodity 20 (hereinafter referred to as discount barcode 25 of the discount label 26) is printed on the discount label 26. The price tag 24 and the discount label 26 are attached to the commodity 20, for example, side by side.

The commodity registration processing apparatus includes a barcode scanner 1, a cash register 2, and a store server 3.

The barcode scanner 1 is mounted with a CPU 4 that controls the entire barcode scanner 1. The barcode scanner 1 includes an imaging device (a camera) 5 such as an image sensor including plural CCDs. A barcode decoder 7, a scan result output interface (I/F) 8, and a commodity sensor 30 are connected to the CPU 4 via a bus 6. A cash register 2 is connected to the scan result output I/F 8.

The barcode scanner 1 decodes the commodity code barcode 23 of the price tag 24 or the commodity code barcode 23 of the price tag 24 and the discount barcode 25 of the discount label 26 on the basis of image data acquired by imaging by the imaging device 5.

The imaging device 5 images, for example, the price tag 24 or the price tag 24 and the discount label 26 in the same imaging area and outputs image data.

When the commodity sensor 30 detects that the commodity 20 is present in the imaging area of the imaging device 5, the barcode decoder 7 decodes the commodity code barcode 23 of the price tag 24 or the commodity code barcode 23 of the price tag 24 and the discount barcode 25 of the discount label 26 on the basis of the image data acquired by the imaging by the imaging device 5.

The scan result output I/F 8 performs data communication between the barcode scanner 1 and the cash register 2 and transmits a decoding result(s) of one or both of the commodity code barcode 23 of the price tag 24 and the discount barcode 25 of the discount label 26 acquired by the barcode decoder 7 to the cash register 2.

The commodity sensor 30 detects whether the commodity 20 is present in the imaging area of the imaging device 5. When, for example, the commodity 20 shown in FIG. 2 is present in the imaging area of the imaging device 5, the commodity sensor 30 outputs a commodity detection signal indicating that the commodity 20 is present in the imaging area. In order to detect whether the commodity 20 is present in the imaging area of the imaging device 5, the commodity sensor 30 detects the presence of the commodity 20 in an area same as the imaging area of the imaging device 5. The commodity sensor 30 is, for example, an ultrasonic sensor or an infrared sensor. The commodity sensor 30 is provided near, for example, the imaging device 5.

The cash register 2 includes a scan result input I/F 9 for inputting decode data from the barcode scanner 1. A memory unit M is connected to the scan result input interface (I/F) 9 via a bus 10. A first memory area 11 and a second memory area 12 are formed in the memory unit M. A cash registration processing unit 13, a cash register interface (I/F) 14, and a data-storage checking unit 31 are connected to the scan result input I/F 9 via the bus 10.

The cash register 2 stores the decoding result of the commodity code barcode 23 of the price tag 24 acquired by the barcode decoder 7 of the barcode scanner 1 in the first memory area 11. For example, a commodity code is stored in the first memory area 11.

The cash register 2 stores the decoding result of the discount barcode 25 of the discount label 26 acquired by the barcode decoder 7 of the barcode scanner 1 in the second memory area 12. For example, a discount code of a commodity is stored in the second memory area 12.

The data-storage checking unit 31 is connected to the bus 10 and determines whether the decoding result of the commodity code barcode 23 is stored in the first memory area 11.

As a result of the determination by the data-storage checking unit 31, if the decoding result of the commodity code barcode 23 is stored in the first memory area 11, the cash registration processing unit 13 performs price adjustment processing for the commodity 20 on the basis of the decoding result of the commodity code barcode 23 or the decoding result of the commodity code barcode 23 and the decoding result of the discount barcode 25 of the discount label 26 stored in the second memory area 12. The cash registration processing unit 13 inquires of the store server 3 about the decoding result of the commodity code barcode 23 or the decoding result of the commodity code barcode 23 and the decoding result of the discount barcode 25 of the discount label 26, reads out price information of the commodity 20 or the price information of the commodity 20 and discount information of the commodity 20 from the store server 3, and performs the price adjustment processing for the commodity 20.

The cash register I/F 14 performs data communication between the cash register 2 and the store server 3.

The store server 3 is mounted with a store server CPU 15. A store server interface (I/F) 16 and a commodity database 17 are connected to the store server CPU 15. The store server I/F 16 performs communication between the store server 3 and the cash register 2. Price information of commodities corresponding to commodity codes, information concerning presence or absence of discounts of the commodities, and the like are stored in the commodity database 17 in advance. When the store server CPU 15 receives a commodity code and a discount code transmitted from the cash register 2, the store server CPU 15 reads out price information of a commodity corresponding to the commodity code from the commodity database 17, reads out discount information of a commodity corresponding to the discount code from the commodity database 17, and returns the price information and the discount information to the cash register 2.

Figure 3:
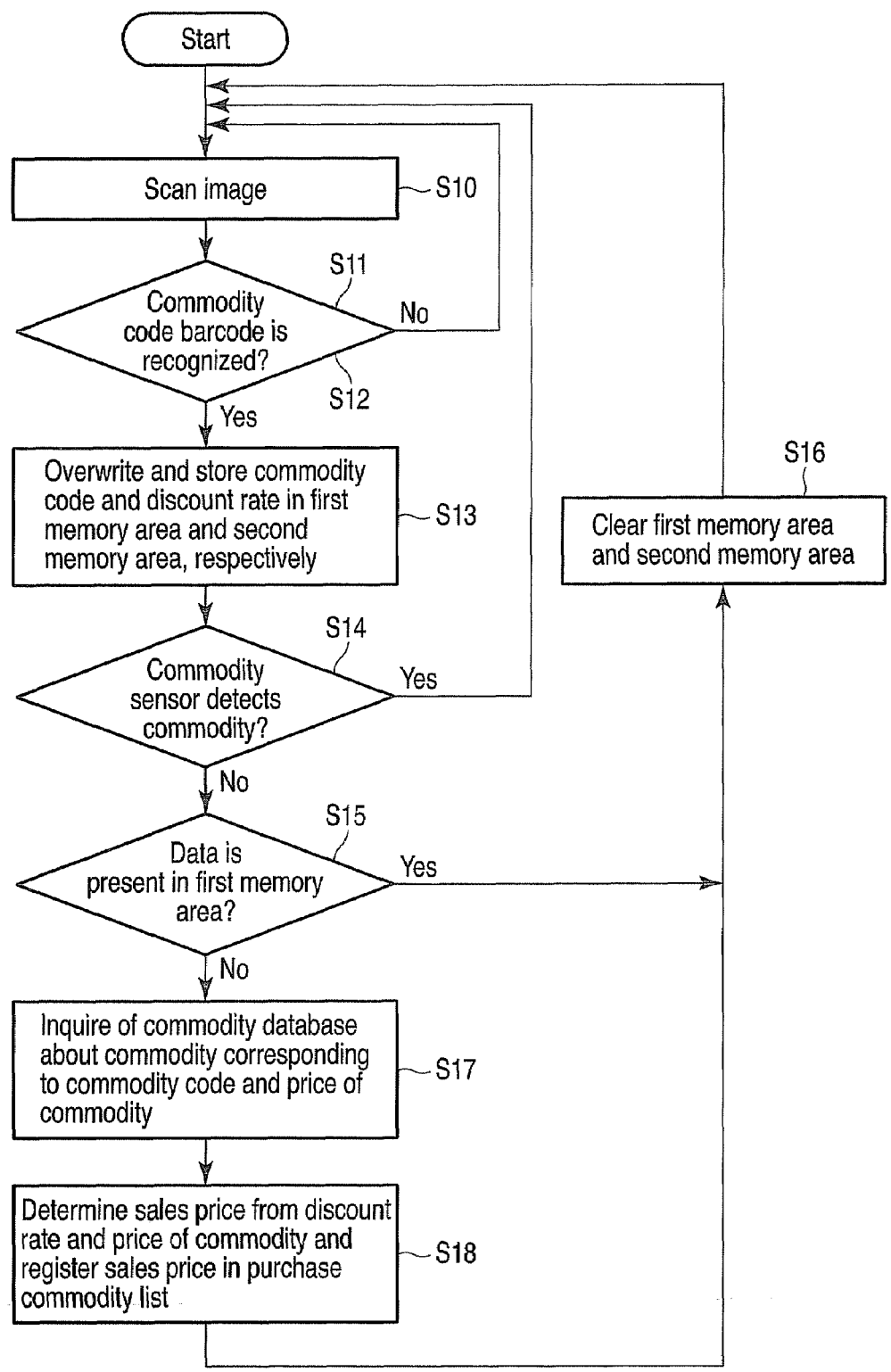
FIG. 3 is a commodity registration processing flowchart in the apparatus.

Operations of the apparatus configured as explained above are explained below according to a commodity registration processing flowchart shown in FIG. 3.

An operator of the cash register 2 places the commodity 20 in the imaging area of the imaging device 5. In Act 10, the imaging device 5 images one or both of the commodity code barcode 23 of the price tag 24 and the discount barcode 25 of the discount label 26 attached to the commodity 20 and outputs image data of the commodity code barcode 23 and the discount barcode 25.

As an imaging range of the imaging device 5 for the commodity 20, for example, as shown in FIG. 2, there area three areas, i.e., a first imaging area E1 including both the commodity code barcode 23 of the price tag 24 and the discount barcode 25 of the discount label 26, a second imaging area E2 including only the discount barcode 25 of the discount label 26, and a third imaging area E3 including only the commodity code barcode 23 of the price tag 24.

The image data output from the imaging device 5 is sent to the barcode decoder 7. The barcode decoder 7 is input with the image data from the imaging device 5, extracts the commodity code barcode 23 of the price tag 24 and the discount barcode 25 of the discount label 26 from the image data, and decodes the commodity code barcode 23 and the discount barcode 25.

If the imaging range of the imaging device 5 is the first imaging area E1, the barcode decoder 7 extracts the commodity code barcode 23 of the price tag 24 and the discount barcode 25 of the discount label 26 from the image data and decodes the commodity code barcode 23 and the discount barcode 25.

If the imaging range of the imaging device 5 is the second imaging area E2, the barcode decoder 7 extracts the discount barcode 25 of the discount label 26 from the image data and decodes the discount barcode 25.

If the imaging range of the imaging device 5 is the third imaging area E3, the barcode decoder 7 extracts the commodity code barcode 23 of the price tag 24 from the image data and decodes the commodity code barcode 23.

Results of the decoding are transmitted to the cash register 2 through the scan result output I/F 8.

In Act 11, the cash register 2 is input with the decoding results transmitted from the barcode scanner 1 through the scan result input I/F 9 and determines whether the commodity code barcode 23 is recognized.

If the imaging range of the imaging device 5 is the first imaging area E1, the decoding results of the commodity code barcode 23 and the discount barcode 25 are included in the first imaging area E1. Therefore, the cash register 2 determines that the commodity code barcode 23 is recognized.

If the imaging range of the imaging device 5 is the second imaging area E2, only the discount barcode 25 is included in the second imaging area E2. Therefore, the cash register 2 does not recognize the decoding result of the commodity code barcode 23.

If the imaging range of the imaging device 5 is the third imaging area E3, only the decoding result of the commodity code barcode 23 is included in the third imaging area E3.

Therefore, the cash register 2 determines that the commodity code barcode 23 is recognized.

As a result of the determination, if the imaging range of the imaging device 5 is the second imaging area E2, the cash register 2 recognizes only the discount barcode 25 and does not recognize the commodity code barcode 23. Consequently, the cash register 2 is input with image data from the imaging device 5 again and repeats Act 10 and Act 11 until the commodity code barcode 23 is recognized from the image data.

If the imaging range of the imaging device 5 is the first imaging area E1 or the third imaging area E3, the cash register 2 recognizes the commodity code barcode 23 regardless of whether the imaging range is the imaging area E1 or the imaging area E3. Consequently, the cash register 2 shifts to Act 13, stores the decoding result of the commodity code barcode 23 in the first memory area 11, and stores the decoding result of the discount barcode 25 in the second memory area 12.

On the other hand, as shown in FIG. 2, the commodity 20 is present in the imaging area of the imaging device 5 regardless of whether the imaging range of the imaging device 5 is the first, second, or third imaging area E1, E2, or E3. The commodity sensor 30 outputs a commodity detection signal indicating that the commodity 20 is present in the imaging area. When the commodity 20 is present in the imaging area, this indicates a state in which the operator of the cash register 2 determines that the commodity code barcode 23 of the price tag 24 or the commodity code barcode 23 and the discount barcode 25 attached to the commodity 20 are not subjected to the registration processing yet.

Specifically, if only the price tag 24 is attached to the commodity 20, the operator moves the commodity 20 out of the imaging area of the imaging device 5 at a point when the commodity code barcode 23 of the price tag 24 is subjected to the registration processing.

If the price tag 24 and the discount label 26 are attached to the commodity 20, the operator moves the commodity 20 out of the imaging area of the imaging device 5 at a point when both the commodity code barcode 23 of the price tag 24 and the discount barcode 25 of the discount label 26 are subjected to the registration processing.

Therefore, if only the price tag 24 is attached to the commodity 20, at a point when the commodity code barcode 23 of the price tag 24 is subjected to the registration processing, the commodity sensor 30 stops the output of the commodity detection signal indicating that the commodity 20 is present in the imaging area.

If the price tag 24 and the discount label 26 are attached to the commodity 20, until both the commodity code barcode 23 of the price tag 24 and the discount barcode 25 of the discount label 26 are subjected to the registration processing, the commodity sensor 30 outputs the commodity detection signal indicating that the commodity 20 is present in the imaging area. Thereafter, when the commodity code barcode 23 of the price tag 24 and the discount barcode 25 of the discount label 26 are subjected to the registration processing, the commodity sensor 30 stops the output of the commodity detection signal indicating that the commodity 20 is present in the imaging area.

Therefore, in Act 14, the cash register 2 determines whether the commodity detection signal indicating that the commodity 20 is present in the imaging area is output from the commodity sensor 30. If the commodity detection signal is output, the cash register 2 repeats Act 10 to Act 14.

On the other hand, when the output of the commodity detection signal from the commodity sensor 30 is stopped, the cash register 2 shifts to Act 15 and determines, with the data-storage checking unit 31, whether the decoding result of the commodity code barcode 23 is stored in the first memory area 11.

As a result of the determination, if the decoding result of the commodity code barcode 23 is not stored in the first memory area 11, the cash register 2 shifts to Act 16, clears the first memory area 11 and the second memory area 12, and returns to Act 10. This is because, if the decoding result of the commodity code barcode 23 is not stored in the first memory area 11, the cash register 2 cannot perform registration and price adjustment processing for the commodity 20.

On the other hand, if the decoding result of the commodity code barcode 23 is stored in the first memory area 11, the cash registration processing unit 13 of the cash register 2 shifts to Act 17 and inquires of the store server 3 about the decoding result.

For example, if the price tag 24 and the discount label 26 are attached to the commodity 20, the cash registration processing unit 13 inquires of the store server 3 about the decoding result of the commodity code barcode 23 stored in the first memory area 11 and the decoding result of the discount barcode 25 stored in the second memory area 12.

The store server 3 reads out, from the commodity database 17, price information of a commodity corresponding to the decoding result of the commodity code barcode 23 inquired by the cash resister 2. At the same time, the store server 3 reads out discount information of the commodity corresponding to the decoding result of the discount barcode 25 from the commodity database 17 and returns the discount information to the cash register 2.

In Act 18, the cash registration processing unit 13 of the cash register 2 receives the price information of the commodity and the discount information of the commodity returned from the store server 3, determines a sales price of the commodity on the bass of the price information of the commodity and the discount information of the commodity, and registers the sales price of the commodity in a purchase commodity list.

The cash registration processing unit 13 of the cash resister 2 waits for a fixed time to elapse and returns to Act 1. The cash registration processing unit 13 performs the price adjustment processing for the commodity on the basis of the sales price of the commodity registered in the purchase commodity list.

The cash register 2 shifts to Act 16, clears the first memory area 11 and the second memory area 12, and returns to Act 10.

On the other hand, if only the price tag 24 is attached to the commodity 20, the cash registration processing unit 13 inquires of the store server 3 about the decoding result of the commodity code barcode 23 stored in the first memory area 11.

The store server 3 reads out, from the commodity database 17, price information of a commodity corresponding to the decoding result of the commodity code barcode 23 inquired by the cash register 2 and returns the price information to the cash register 2.

In Act 18 the cash registration processing unit 13 of the cash register 2 receives the price information of the commodity returned from the store server 3, determines a sales price of the commodity on the basis of the price information of the commodity, and registers the sales price in the purchase commodity list.

The cash registration processing unit 13 of the cash register 2 waits for a fixed time to elapse and returns to Act 1. The cash registration processing unit 13 performs the price adjustment processing for the commodity on the basis of the sales price of the commodity registered in the purchase commodity list.

The cash register 2 shifts to Act 16, clears the first memory area 11 and the second memory area 12, and returns to Act 10.

As explained above, according to the embodiment, the commodity sensor 30 detects whether the commodity 20 is present in the imaging area of the imaging device 5. When the commodity sensor 30 detects that the commodity 20 is present in the imaging area of the imaging device 5, the barcode decoder 7 decodes the commodity code barcode 23 of the price tag 24 or the commodity code barcode 23 of the price tag 24 and the discount barcode 25 of the discount label 26 on the basis of the image data acquired by the imaging by the imaging device 5. The cash register 2 performs the registration and price adjustment processing for the commodity 20 on the basis of the decoding result of the commodity code barcode 23 or the decoding result of the commodity code barcode 23 and the decoding result of the discount barcode 25.

Consequently, if the price tag 24 and the discount label 26 are attached to the commodity 20, until both the commodity code barcode 23 of the price tag 24 and the discount barcode 25 of the discount label 26 are subjected to the registration processing, the operator of the cash register 2 keeps the commodity 20 in the imaging area of the imaging device 5. As a result, it is possible to surely scan the decoding results of the commodity code barcode 23 and the discount barcode 25 and perform the registration and price adjustment processing for the commodity 20.

If the price tag 24 and the discount label 26 are attached to the commodity 20, the cash registration processing unit 13 does not inquire of the store server 3 about a decoding result of the commodity code barcode 23 of the price tag 24 or the decoding result of the commodity code barcode 23 and the decoding result of the discount barcode 25 of the discount label 26 until both the commodity code barcode 23 and the discount barcode 25 are subjected to the registration processing. If only the price tag 24 is attached to the commodity 20, the cash registration processing unit 13 inquires of the store server 3 about a decoding result of the commodity code barcode 23 of the price tag 24 at a point when the commodity code barcode 23 is subjected to the registration processing. Therefore, it is possible to surely scan, according to presence or absence of a discount of the commodity 20, the commodity code barcode 23 of the commodity 20 or the commodity code barcode 23 and the discount barcode 25 of the commodity 20 and perform the registration processing for the commodity 20. Therefore, it is possible to improve operability.

If a decoding result of the commodity code barcode 23 is not stored in the first memory area 11, the cash registration processing unit 13 does not inquire of the store server 3 about the decoding result. Consequently, when the price tag 24 and the discount label 26 are attached to the commodity 20, the cash registration processing unit 13 does not shift to the registration and price adjustment processing for the commodity 20 even if the discount barcode 25 is subjected to the registration processing and abstains from shifting to the registration and price adjustment processing for the commodity 20 until the commodity code barcode 23 is subjected to the registration processing. Therefore, when the price tag 24 and the discount label 26 are attached to the commodity 20, the cash registration processing unit 13 can shift to the registration processing for the commodity 20 after surely scanning both the commodity code barcode 23 and the discount barcode 25.

Therefore, in operation of the barcode scanner 1 by the operator of the cash register 2, it is unlikely that the operator scans only the commodity code barcode 23 of the commodity 20 and finishes the work without scanning the discount barcode 25.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In the embodiment explained above, plural discount labels 26 may be attached to the commodity 20. In this case, the cash register 2 determines a newest discount label 26 in terms of time among the plural discount labels 26 and performs the registration and price adjustment processing for the commodity 20 on the basis of the newest discount label 26 and the commodity code barcode 23.

The commodity sensor 30 can also subject image data output from the imaging device 5 to image processing and determine whether the commodity 20 is present in the imaging area of the imaging device 5. Consequently, the imaging device 5 can be used as both an imaging device that images the commodity code barcode 23 and the discount label 26 and a sensor that detects whether the commodity 20 is present in the imaging area of the imaging device 5.

What is claimed is:

1. A commodity registration processing apparatus comprising:
    an imaging device that images a first data code or the first data code and a second data code attached to a commodity;
    a commodity sensor that detects whether the commodity is present in an imaging area of the imaging device;
    a decoding unit that decodes, while the commodity sensor detects that the commodity is present in the imaging area, the first data code or the first data code and the second data code on the basis of image data acquired by the imaging by the imaging device;
    a registration processing unit that performs at least registration processing for the commodity on the basis of a decoding result of the first data code acquired by the decoding unit or the decoding result of the first data code and a decoding result of the second data code;
    a first memory unit that stores the decoding result of the first data code acquired by the decoding unit;
    a second memory unit that stores the decoding result of the second data code acquired by the decoding unit; and
    a data-storage checking unit that determines whether the decoding result of the first data code is stored in the first memory unit;
    wherein the registration processing unit performs, if the decoding result of the first data code is stored in the first memory unit as a result of the determination by the data-storage checking unit, at least the registration processing for the commodity on the basis of the decoding result of the first data code or the decoding result of a first data code and the decoding result of the second data code acquired by the decoding unit.

2. The apparatus according to claim 1, wherein the first data code represents a code peculiar to the commodity; and
    the second data code represents a discount code of the commodity.

3. The apparatus according to claim 1, wherein the commodity sensor is provided near the imaging device.

4. The apparatus according to claim 1, wherein the commodity sensor includes an ultrasonic sensor or an infrared sensor.

5. A commodity registration processing apparatus comprising:
- a scanner unit that includes an imaging device that images a first data code attached to a commodity and representing a code of the commodity or the first data code and a second data code representing a discount code of the commodity, the scanner unit decoding the first data code or the first data code and the second data code on the basis of image data acquired by the imaging by the imaging device;
- a server that stores at least price information of the commodity corresponding to the first data code and price information of a discount of the commodity corresponding to the second data code; and
- a cash register that inquires of the server about at least a decoding result of the first data code acquired by the scanner unit, reads out at least the price information of the commodity from the server, and performs price adjustment processing for the commodity, wherein the scanner unit includes a commodity sensor that detects whether the commodity is present in an imaging area of the imaging device, and the cash resister includes:
- a first memory unit that stores, while the commodity sensor detects that the commodity is present in the imaging area, a decoding result of the first data code acquired by the scanner unit;
- a second memory unit that stores, while the commodity sensor detects that the commodity is present in the imaging area, a decoding result of the second data code acquired by the scanner unit;
- a data-storage checking unit that determines whether the decoding result of the first data code is stored in the first memory unit; and
- a registration processing unit that performs, if the decoding result of the first data code is stored in the first memory unit as a result of the determination by the data-storage checking unit, at least registration processing for the commodity on the basis of the decoding result of the first data code or the decoding result of the first data code and the decoding result of the second data code acquired by the decoding unit.

6. The apparatus according to claim 5, wherein the commodity sensor includes an ultrasonic sensor or an infrared sensor.

7. A commodity registration processing method comprising:
- imaging, with an imaging device, a first data code or the first data code and a second data code attached to a commodity;
- detecting whether the commodity is present in an imaging area of the imaging device;
- decoding, while detecting that the commodity is present in the imaging area, the first data code or the first data code and the second data code on the basis of image data acquired by the imaging by the imaging device;
- performing at least registration processing for the commodity on the basis of a decoding result of the first data code or the decoding result of the first data code and a decoding result of the second data code;
- storing in a first memory unit the decoding result of the first data code acquired by the decoding;
- storing in a second memory unit the decoding result of the second data code acquired by the decoding; and
- determining, with a data-storage checking unit, whether the decoding result of the first data code is stored in the first memory unit;
- wherein the registration processing performs, if the decoding result of the first data code is stored in the first memory unit as a result of the determination by the data-storage checking unit, at least the registration processing for the commodity on the basis of the decoding result of the first data code or the decoding result of the first data code and the decoding result of the second data code acquired by the decoding unit.

* * * * *